United States Patent
Hakkani-Tur et al.

(10) Patent No.: US 7,949,525 B2
(45) Date of Patent: May 24, 2011

(54) ACTIVE LABELING FOR SPOKEN LANGUAGE UNDERSTANDING

(75) Inventors: Dilek Z. Hakkani-Tur, Parsippany, NJ (US); Mazin G. Rahim, Warren, NJ (US); Gokhan Tur, Parsippany, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

(21) Appl. No.: 12/485,103

(22) Filed: Jun. 16, 2009

(65) Prior Publication Data

US 2009/0254344 A1 Oct. 8, 2009

Related U.S. Application Data

(63) Continuation of application No. 11/862,656, filed on Sep. 27, 2007, now Pat. No. 7,562,017, which is a continuation of application No. 10/447,889, filed on May 29, 2003, now Pat. No. 7,292,982.

(51) Int. Cl.
*G10L 15/00* (2006.01)
*G10L 15/06* (2006.01)
*G10L 15/20* (2006.01)

(52) U.S. Cl. ........ 704/245; 704/231; 704/236; 704/238; 704/243

(58) Field of Classification Search ................ 704/238, 704/245
See application file for complete search history.

(56) References Cited

U.S. PATENT DOCUMENTS

| | | |
|---|---|---|
| 4,803,729 A | 2/1989 | Baker |
| 5,263,117 A | 11/1993 | Nadas et al. |
| 5,317,673 A | 5/1994 | Cohen et al. |
| 5,625,748 A | 4/1997 | McDonough et al. |
| 5,715,367 A | 2/1998 | Gillick et al. |
| 5,960,397 A | 9/1999 | Rahim |
| 6,421,655 B1 * | 7/2002 | Horvitz et al. ............... 706/61 |
| 6,941,266 B1 | 9/2005 | Gorin et al. |

OTHER PUBLICATIONS

A.L. Gorin, A. Abella, T. Alonso, G. Riccardi, and J.H. Wright, "Automated Natural Spoken Dialog," IEEE Computer Magazine, vol. 35, No. 4, pp. 51-56, Apr. 2002.
A.L. Gorin, G. Riccardi, and J. H. Wright, "How May I Help You?," Speech Communication, 1997.
S. Abney, R. Schapire, and Y. Singer, "Boosting Applied to Tagging and PP Attachment," in Proceedings of the Joint SIGDAT Conference on Empirical Methods in Natural Language Processing and Very Large Corpora, pp. 38-45. 1999.
R. Schapire and Y. Singer, "BoosTexter: A Boosting-Based System for Text Categorization," Machine Learning, vol. 39, No. 2/3, pp. 135-168, 2000.
E. Eskin, "Detecting Errors Within a Corpus using Anomaly Detection," in Proceedings of the NAACL, Seattle, WA, Apr. 2000.
M. Murata, M. Utiyama, K. Uchimoto, Q. Ma and H. Isahara, "Correction of Errors in a Modality Corpus Used for Machine Translation by Using Machine-learning Method," in Proceedings of the TMI, Japan, Mar. 2002.
H. van Halteren, "The Detection of Inconsistency in Manually Tagged Text", in Proceedings of the Workshop on Linguistically Interpreted Corpora (LINC'00), Luxembourg, Aug. 2000.

* cited by examiner

*Primary Examiner* — Justin W Rider (57) ABSTRACT

A spoken language understanding method and system are provided. The method includes classifying a set of labeled candidate utterances based on a previously trained classifier, generating classification types for each candidate utterance, receiving confidence scores for the classification types from the trained classifier, sorting the classified utterances based on an analysis of the confidence score of each candidate utterance compared to a respective label of the candidate utterance, and rechecking candidate utterances according to the analysis. The system includes modules configured to control a processor in the system to perform the steps of the method.

14 Claims, 5 Drawing Sheets

ACTIVE LABELING FOR SPOKEN LANGUAGE UNDERSTANDING

PRIORITY CLAIM

The present application is a continuation of U.S. patent application Ser. No. 11/862,656, filed Sep. 27, 2007, which is a continuation of U.S. patent application Ser. No. 10/447,889, filed May 29, 2003, now U.S. Pat. No. 7,292,982, the contents of which are incorporated herein by reference in their entirety.

TECHNICAL FIELD

The present application relates generally to spoken language understanding systems and more particularly to active labeling for spoken language understanding systems.

BACKGROUND

Natural language spoken dialog systems enable customers to express what they want in spoken natural language. Such systems automatically extract the meaning from speech input and act upon what people actually say, in contrast to what one would like them to say, shifting the burden from users to the machine user interface. In a natural language spoken dialog system, identifying the customer's intent can be seen as a general intent classification problem.

When statistical classifiers are employed to identify customer intent, they are typically trained using large amounts of task data that is transcribed and labeled by humans, a very expensive and laborious process. Here, labeling generally refers to the assignment of one or more predefined classification labels (e.g., calltypes) to each utterance.

It is clear that the bottleneck in building a decent statistical system is the time spent for high quality labeling. Due to a process that is naturally prone to errors, each one of the labels is usually verified by an independent party to achieve an acceptable level of quality.

An utterance can be mislabeled for many reasons, including simple labeler error and an imperfect description of classification types. It should also be noted that for multi-label tasks, where an utterance may get more than one label, it is necessary to label the utterance with all appropriate labels. If any of the labels is missing, it is considered a labeling error.

For these reasons, usually a second (or maybe more) pass(es) of labeling is required in order to check and fix the labeling errors and inconsistencies of the first (or earlier) pass(es). The motto "There is no data like more data" will generally hold only if the additional data is less "noisy", i.e., the data contains less than a tolerable number of mislabeled utterances. Most state-of-the-art classifiers can tolerate a few percentage points of noisy data, but more significant error levels can ruin the classification performance no matter how robust the classifiers are.

SUMMARY

Labeling is an error-prone process due to various reasons, such as labeler errors or imperfect description of classes. In accordance with the present application, the labeling effort is enhanced through a process that identifies and corrects errors and inconsistencies while checking a minimum amount of data. This active labeling process is not dependent upon the particular classifier model.

In one embodiment, the errors and inconsistencies are identified based on the confidences obtained from a previously trained classifier model. In another embodiment, the errors and inconsistencies are identified based on an unsupervised learning process. In both scenarios, the active labeling process aims to minimize the number of utterances to be checked again by automatically selecting the ones that are likely to be erroneous or inconsistent with the previously labeled examples.

The active labeling process, in one embodiment, is implemented in a spoken language understanding system that includes a processor and modules configured to control the processor. The system also includes a system bus coupling the processor with the modules and various components including system memory, storage devices, and communication interface devices. The modules of the system include a module configured to control the processor to classify a set of labeled candidate utterances based on a previously trained classifier and generate classification types for each candidate utterance. The system also include a module configured to control the processor to sort the candidate utterances based on an analysis of the confidence score of each candidate utterance compared to a respective label of the candidate utterance, and a module configured to control the processor to recheck candidate utterances according to the analysis.

Additional features and advantages of the application will be set forth in the description which follows, and in part will be obvious from the description, or may be learned by practice. The features and advantages of the application may be realized and obtained by means of the instruments and combinations particularly pointed out in the appended claims. These and other features will become more fully apparent from the following description and appended claims, or may be learned by the practice.

BRIEF DESCRIPTION OF THE DRAWINGS

In order to describe the manner in which the above-recited and other advantages and features of the disclosure can be obtained, a more particular description above will be rendered by reference to specific embodiments thereof which are illustrated in the appended drawings. Understanding that these drawings depict only exemplary embodiments and are not therefore to be considered to be limiting of its scope, this disclosure will provide with additional specificity and detail through the use of the accompanying drawings in which.

DETAILED DESCRIPTION

Various embodiments are discussed in detail below. While specific implementations are discussed, it should be understood that this is done for illustration purposes only. A person skilled in the relevant art will recognize that other components and configurations can be used without parting from the spirit and scope of this disclosure.

State-of-the-art spoken language understanding (SLU) systems are trained using human-labeled utterances, the preparation of which is labor intensive and time consuming. As noted, labeling is an error-prone process due to various reasons (e.g., labeler error or the imperfect description of classes). Thus, usually a second (or maybe more) pass(es) of labeling is required in order to check and fix the labeling errors and inconsistencies of the first (or earlier) pass(es).

In one embodiment, an active labeling process is provided that reduces the labeling effort in a statistical classification system. In general, active labeling aims to minimize the number of utterances to be checked again by automatically selecting the utterances that are likely to be erroneous or inconsistent with previously labeled examples, hence reducing the amount of human labeling effort. This process enables the building of better classification systems in a shorter time frame and at reduced costs.

Multiple active labeling embodiments are described below. In these embodiments, it is assumed that there exists a set of labeled but unchecked utterances, which probably contain some amount of errors and inconsistencies. In one embodiment, which relates to certainty-based active labeling, also assumes a readily available prior classification model trained with human-labeled and checked data, while another embodiment, which relates to unsupervised active labeling, is completely unsupervised and does not need any prior model. It should further be noted that the active-labeling embodiments described herein can be implemented in a manner that is independent of the classifier used.

One embodiment is now described with reference to the flowchart illustrated in FIG. 1. One of the aims of the illustrated embodiment is to select a set of utterances that the classifier is confident about but are in disagreement with the first labeler's decision. This selection process leaves out the utterances where the classifier agrees with the labeler's decision with high confidence.

This process begins at step 110 where previously labeled yet unchecked utterances are retrieved. Next, at step 120, the retrieved utterances are classified using a previously trained classifier. The classifier is trained using the previous portions of training data. The classifier, in one embodiment, is a module operatively coupled with a processor of a computing system that includes a system bus for coupling various components with the processor. The components can include system memory such as read-only memory (ROM) or random access memory (RAM), basic input/output (BIOS), storage devices, network interface adapters, etc. Modules can combine programming by software or firmware that are configured to control the processor to perform the various steps disclosed herein.

As noted, the embodiments of the present disclosure are not dependent on the use of a particular classifier. In the first embodiment, confidence scores are used. These confidence scores may be generated by a classifier, for example, which returns a confidence, $Q(i|U)$, between 0 and 1 for each of the labels, $i \in L$, where L is the set of all classification types (e.g., calltypes), for a given utterance, U.

As would be appreciated by one of ordinary skill in the relevant art, confidence scores may also be derived from output generated by a particular classifier. In this case, the classifier indirectly produces the confidence scores.

Regardless of whether the particular classifier directly or indirectly produces confidence scores, at step 130, the confidence scores are obtained for each classification type. For example, in a telecommunications application such as AT&T's "How May I Help You?" (HMIHY) service, confidence scores are obtained for each calltype, such as billing, collect call, rate information, etc.

The classifier confidence scores are then used to predict which candidate utterances are classified with high/low confidence. Specifically, at step 140, the candidate utterances are sorted based on an analysis of the classifier confidence scores for all the classification types and the first labeler's decision.

Various criteria can be used to sort the candidate utterances for further checking. In the description below, various examples of possible criteria are presented as examples. These examples are not intended to be exhaustive of the potential sorting criteria that could be applied to produce a set of candidate utterances to be rechecked. Indeed, the particular sorting criteria can be specifically designed to produce specifically targeted outputs intended to meet a particular labeling deficiency or the available resources for rechecking the identified utterances.

For example, it is possible to select the utterances where the classifier's top choice is not among the classification types that the labeler has selected. This criterion works fine for most cases, but may miss one type of error for multi-label tasks. Specifically, it is sometimes possible for the second-pass labeler to add an additional calltype to that utterance. Even though the classifier's top choice matches one of the labels of the first pass with high enough confidence, this does not mean that this utterance has been labeled correctly.

Alternatively, it is possible to select the utterances where the first pass labeler's choices (some or all) get some confidence scores greater than some threshold. Similar to the previous example, this criterion may also not be sufficient. There may also exist cases where there is another classification type that gets an even higher confidence score and should be added to the true classification types.

As seen by this brief set of examples, it may be advantageous to consider all the confidence scores of all the classification types. Thus, in one embodiment, a generalized selection and sorting criterion can be used. This generalized selection and sorting criterion can be based on the Kullback-Leibler (KL) divergence (or binary relative entropy) between the first pass labels, P, and the classifier outputs, Q. More formally, the KL divergence computation can be expressed as:

$$KL(P\|Q) = \sum_{i \in L} p_i \times \log\left(\frac{p_i}{q_i}\right) + (1 - p_i) \times \log\left(\frac{1 - p_i}{1 - q_i}\right)$$

where L is the set of all classification types, $q_i$ is the probability of the $i^{th}$ classification type obtained from the classifier, and p=1 if that classification type is previously labeled and p=0 if otherwise.

With this KL-divergence criterion, all of the utterances where the computation is greater than some threshold will be designated for rechecking. The set of all identified utterances are then rechecked at step 150.

At this point it should be recognized that the set of all utterances that have been identified by the particular sorting criteria represents just a small subset of the data. Thus, the principles of the present disclosure enable a large percentage of the labeling errors or inconsistencies in the data to be examined by checking only a portion of the overall data. This facilitates a rapid and cost-effective mechanism for training a SLU system.

In another active-labeling embodiment, it is assumed that there is no readily available classifier model. In other words, only a set of labeled and unchecked utterances with some amount of errors and inconsistencies is available. In this case, a different active labeling method is employed. This alternative active labeling method is described below with reference to the flowchart of FIG. 2.

Figure 2:
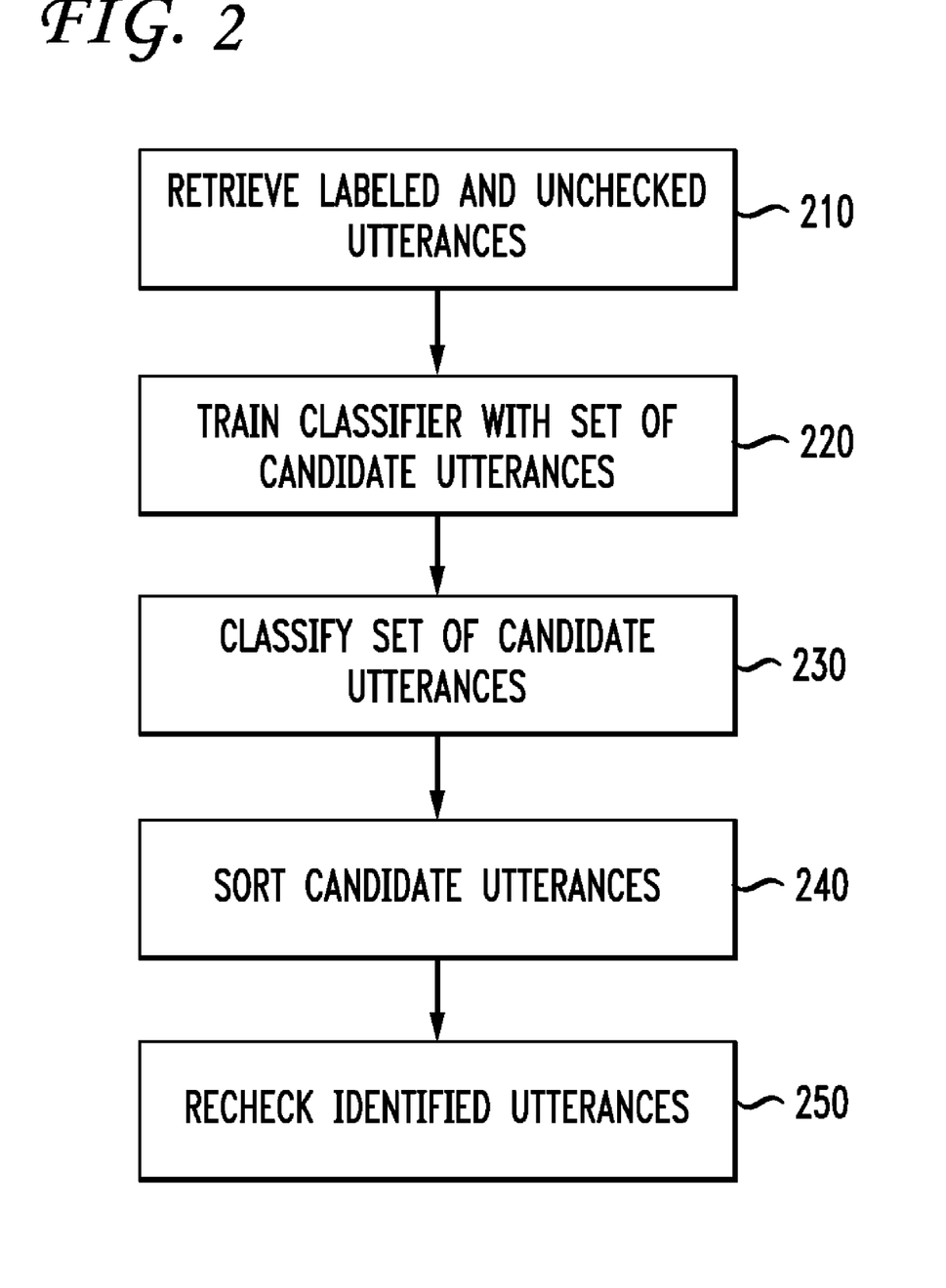
FIG. 2 illustrates a processing flowchart of a second embodiment.

As illustrated, the process begins at step 210 where previously labeled yet unchecked utterances are retrieved. Next, at step 220, a classifier is trained using the set of candidate utterances as if it is the training data.

The set of candidate utterances is then classified with the now-trained classifier at step 230. In other words, the same noisy data used to train the classifier is now classified by that same classifier. The reasoning here is that the utterances in the training data which are not classified correctly are more probably the labeling errors.

Accordingly, at step 240, the classified utterances are sorted by determining which of the classified utterances have classifications that are distinct from the labels that have been assigned to the original data. If the classifications do not match, then that utterance will be designated for rechecking. The set of all identified utterances are then rechecked at step 250 to resolve the error or inconsistency.

Here, it should be noted again that the second active-labeling embodiment does not require the use of a particular type of classifier. Rather, the process described above can be applied to any generic classifier.

It should further be noted that the second active-labeling embodiment does not require any human-labeled high quality data. Rather, the classifier is trained using labeled but unchecked data. Thus, the technique incorporated by the illustrated active-labeling embodiment can be referred to as unsupervised active labeling.

Figure 1:
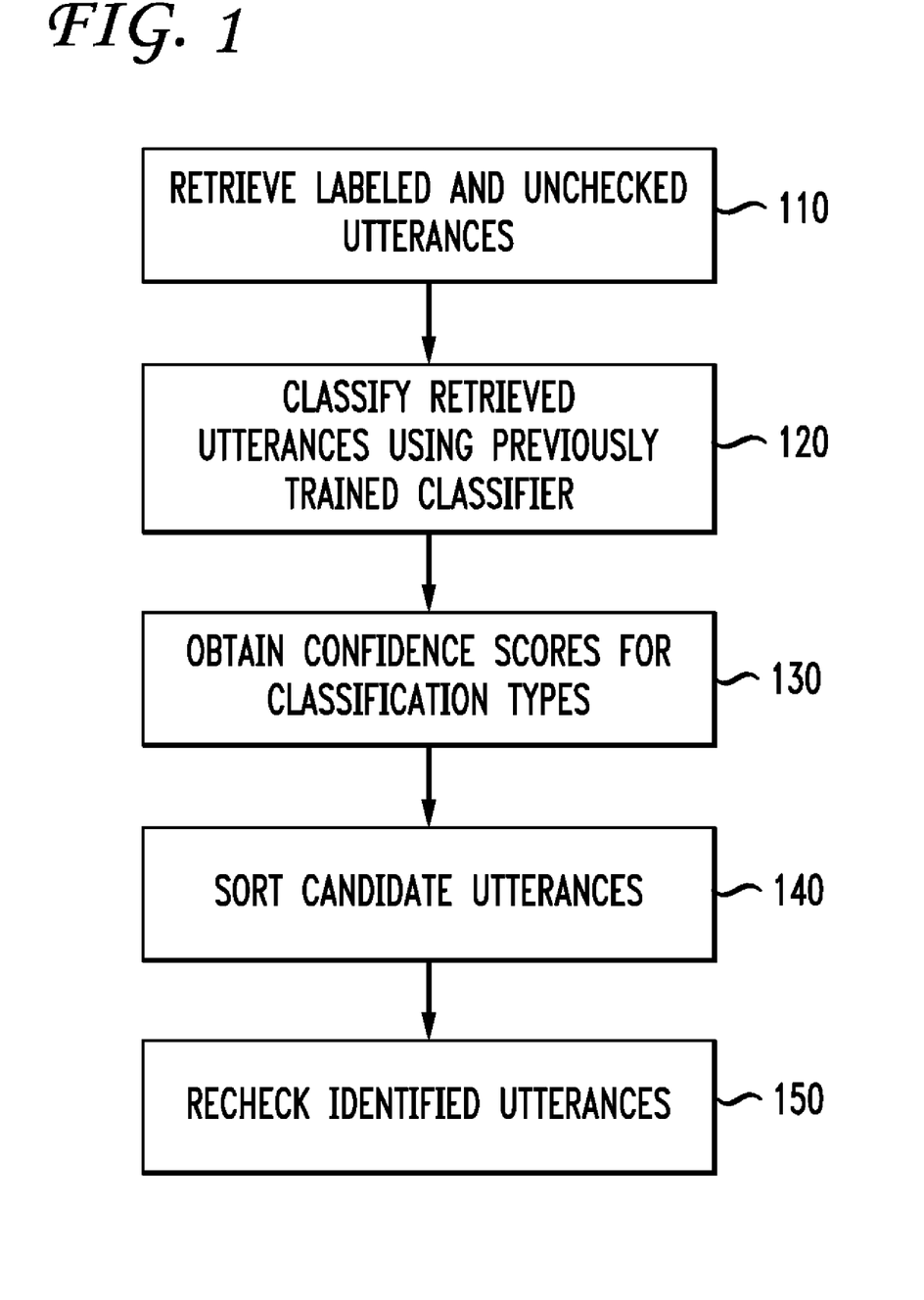
FIG. 1 illustrates a processing flowchart of a first embodiment.

Similar to the active labeling embodiment of FIG. 1, it is also to possible to put a threshold if the classifier is iterative, such as the classifier disclosed in R. E. Schapire and Y. Singer, "BoosTexter: A Boosting-Based System For Text Categorization," Machine Learning, Vol. 39, No. 2/3, pp. 135-168, 2000, which is incorporated herein by reference in its entirety. In such cases, the classifier may continue training with noisy data until the error rate for the training data is less than some threshold, and the utterances which are not classified as in their first pass labels are sent for a second pass of labeling. Alternatively, one may check the confidences of the labels and check the ones that are classified with a low confidence.

These active labeling embodiments have been evaluated using utterances from a natural dialog customer care system. This system aims to classify the user utterances into 32 calltypes in total. In the experiments, a set of 11,160 utterances was used, 90% of the utterances were used for training, while the remaining 10% was used for testing. In total, 11% of the utterances had more than one label, while there were 1.15 labels per utterance on average. In all the experiments, Schapire's BoosTexter classifier was used along with n-grams of the utterances as features.

Before implementing any of the active labeling methods, the effect of the labeling errors to the classification performance was also checked. For this purpose, the classifier was trained using the first-pass labels and second-pass corrected labels, the difference being checked.

As a result, 13% of the utterances were corrected in the test data, while 9% of them were changed completely (i.e., there was no common label left between the first and second passes). This is a big noise rate and suggests that a second pass of checking is crucial to train decent classifier models. It should also be noted that there were probably more labeling errors even after the second pass.

Figure 3:
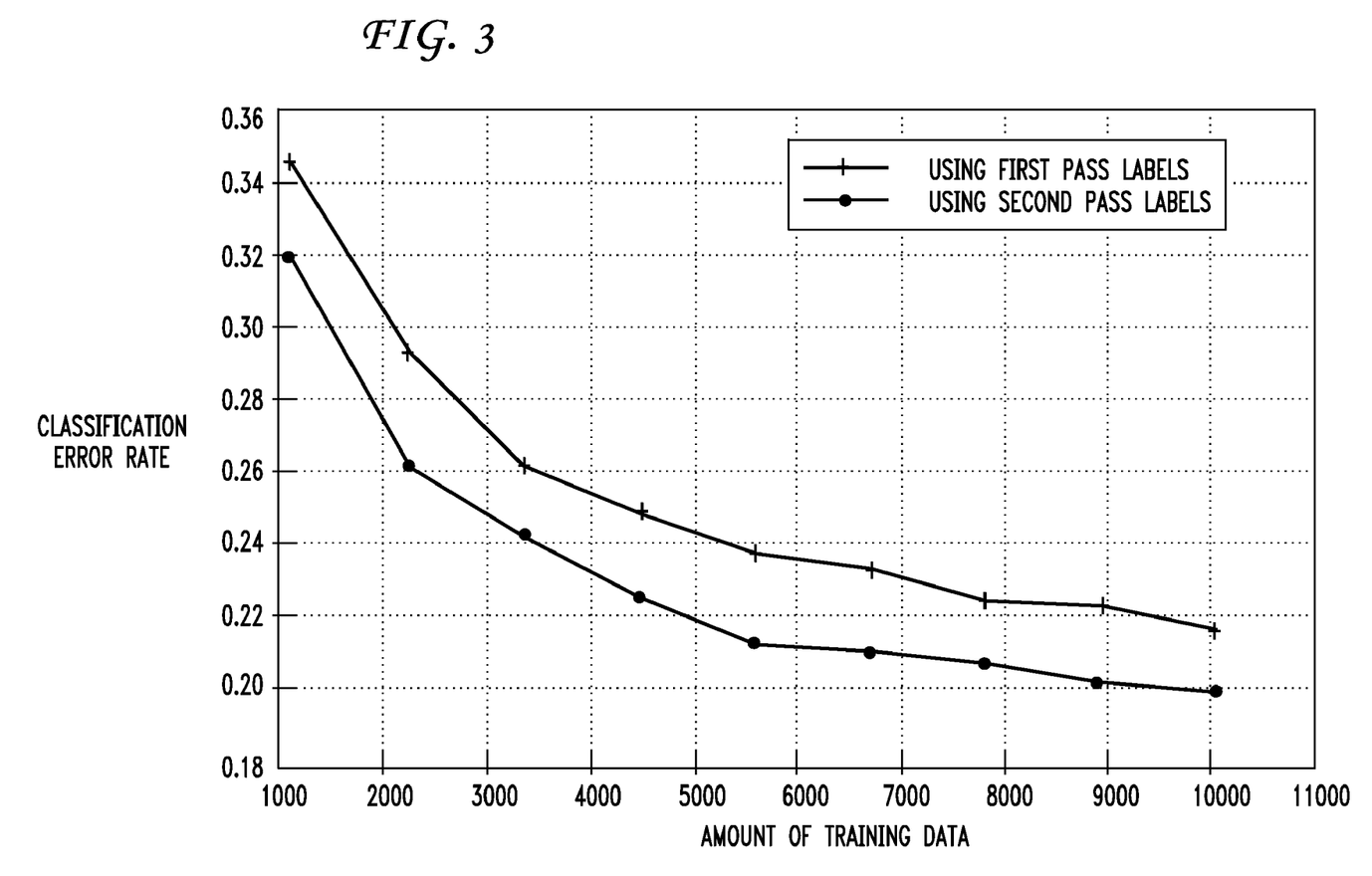
FIG. 3 illustrates a graph that shows the effect of labeling errors to classification performance.

FIG. 3 illustrates a graph that shows the classification performances using checked and unchecked training data. As illustrated, using unchecked labels, the classification error rate increases by 2%-3% points absolute, that is, about 10% relative reduction in the performance. In other words, the classifier needs twice as much unchecked data in order to obtain the same performance with checked data. These results justify the motivations for active labeling.

Figure 4:
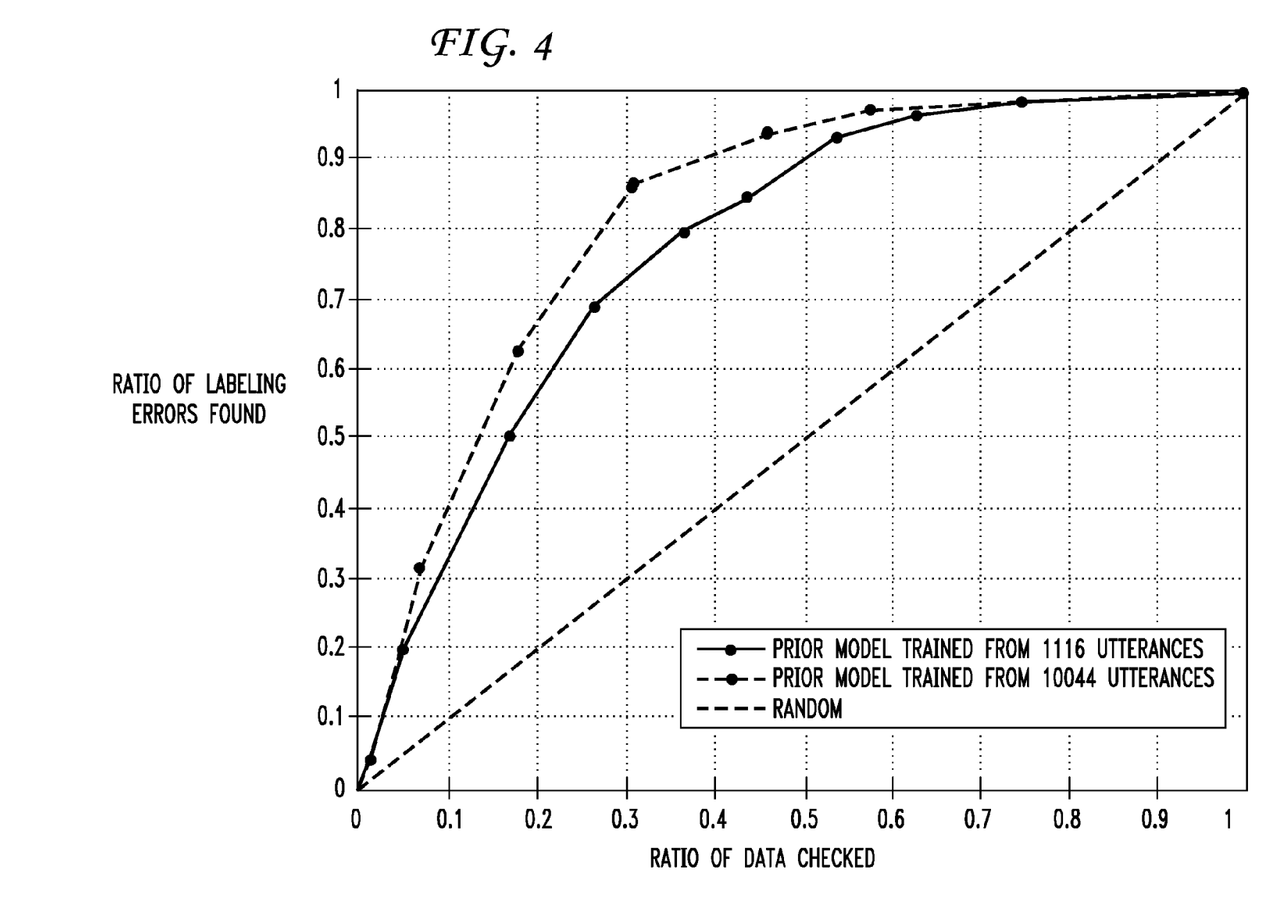
FIG. 4 illustrates a graph that shows the results of experiments using the first active labeling embodiment.

FIG. 4 illustrates a graph that shows the results of experiments using the first active labeling embodiment. As illustrated, the graph draws the ratio of labeling errors found with respect to the ratio of utterances checked. The diagonal dashed line is the baseline where both ratios are equal. This is the performance you may expect without active labeling. These curves were drawn by putting a threshold on the KL divergence.

The solid line is obtained using a prior classification model trained using 1,116 utterances and the dashed line is obtained using all 10,044 utterances. The curves for prior model data sizes between these have not been drawn, since those curves lie in-between, as expected. For both curves, this active labeling embodiment outperforms the baseline, even using just 1,116 utterances, and finds about 90% of the errors using just half the data, or finds 75% of the errors checking one third of the utterances. Furthermore, the active labeling performance increases as the prior model gets better with more data. The ratio of labeling errors found increases from 72% to 83% by using a better prior model when 30% of the utterances are checked.

Figure 5:
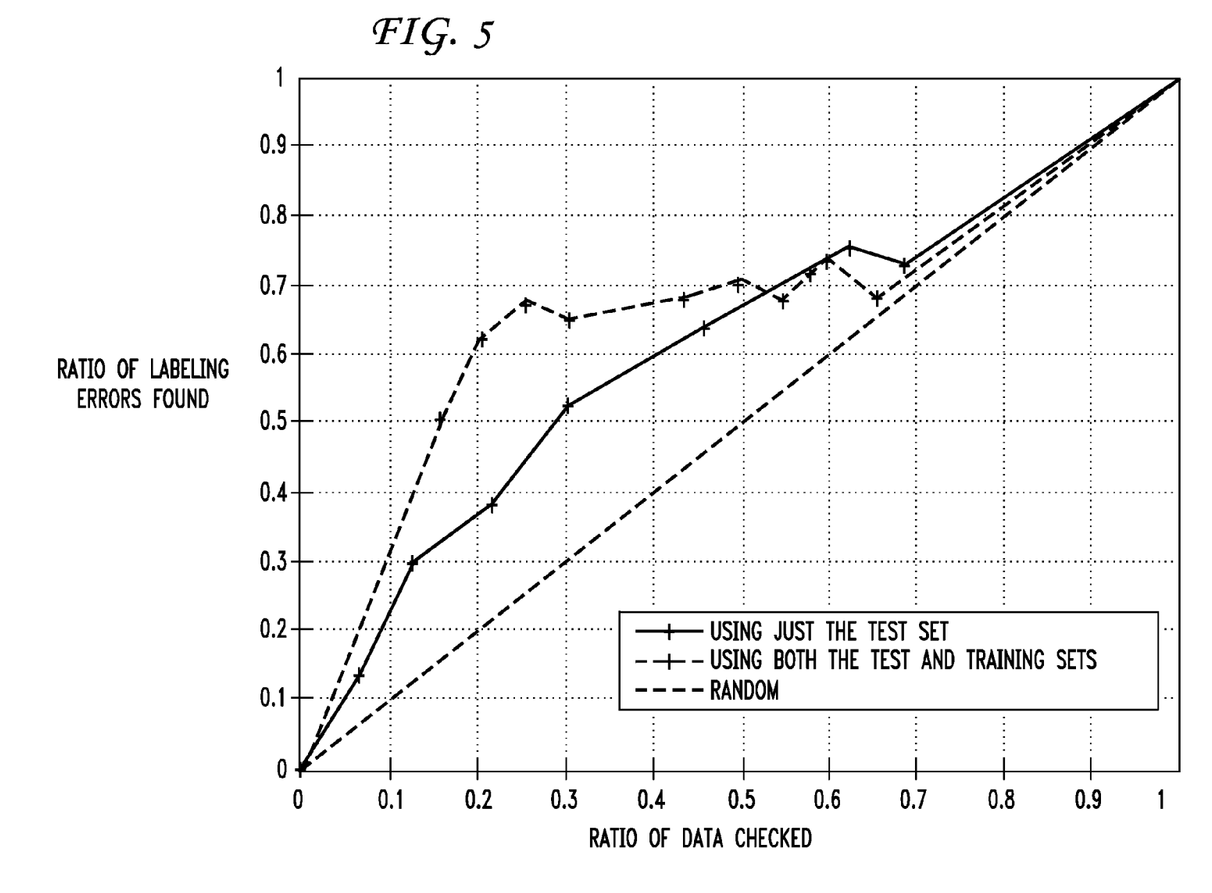
FIG. 5 illustrates a graph that shows the results of experiments using the second active labeling embodiment.

FIG. 5 illustrates a graph that shows the results of experiments using the active labeling embodiment of FIG. 2. Two curves have been drawn by different numbers of Boosting iterations. The solid line is obtained using just the test data. The dashed line is obtained by using all 11,160 utterances, but then evaluating only on the test set. This method outperforms the baseline, but underperforms the active labeling embodiment of FIG. 1. It finds about 70% of the errors using just half the data, or finds about $2/3$ of the errors checking $1/3$ of the utterances. In order to see the effect of the number of the candidate utterances used in this method to the performance, we have varied the candidate utterance set size, but only checked the performance on the test set to get comparable results. At 30% of the data checked, the ratio of labeling errors found increases about 10% absolute using a greater number of utterances.

As thus described, active labeling methods have been identified for reducing the number of utterances to be checked by automatically selecting the ones that are likely to be erroneous or inconsistent with the previously labeled examples. The results have shown that it is possible to speed up the second pass of labeling significantly. The results further indicate that it is possible to find about 90% of the labeling errors using just half the data. These results are especially important when there is little time for noise-free labeling. It is also clear that these methods can be used to clean up and even correct already labeled data as a post-processing step. Furthermore, these methods are general and can be used for any available classification task.

Further embodiments may also include tangible computer-readable media for carrying or having computer-executable instructions or data structures stored thereon. Such tangible computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hard-wired, wireless, or a combination thereof) to a computer, the computer properly views the connection as a computer-readable medium. Thus, any such connection is properly termed a tangible computer-readable medium. Tangible computer-readable storage media expressly exclude media such as energy, carrier signals, electromagnetic waves, and signals per se. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments are part of the scope of this invention. For example, certain embodiments are described with reference to a SLU component within a spoken dialog system. However, the systems and methods described herein may have applicability in a variety of environments where SLU may be used. Those skilled in the art will readily recognize various modifications and changes that can be made to the present disclosure without following the example embodiments and applications illustrated and described herein, and without departing from the true spirit and scope of the disclosed embodiments.

What is claimed is:

1. A spoken language understanding system comprising:
a processor;
a first module configured to control the processor to classify a set of labeled candidate utterances based on a previously trained classifier and generate classification types for each candidate utterance, each classification type having a respective confidence score;
a second module configured to control the processor to sort the candidate utterances based on an analysis of the confidence score of each candidate utterance compared to a respective label of the candidate utterance, wherein the analysis is based at least in part on a Kullback-Liebler divergence; and
a third module configured to control the processor to recheck candidate utterances according to when the Kullback-Liebler divergence is greater than a threshold.

2. The system of claim 1, wherein the confidence scores are generated for a plurality of labels associated with the classification types.

3. The system of claim 1, wherein the confidence scores are received from the previously trained classifier.

4. The system of claim 1, wherein the analysis is based on a comparison of the generated classification type of the candidate utterance and the label of the candidate utterance, and the module rechecks the candidate utterances when the generated classification type does not match the label of the candidate utterance.

5. The system of claim 1, wherein the Kullback-Leibler divergence is based on the computation:

$$KL(P\|Q) = \sum_{i \in L} p_i \times \log\left(\frac{p_i}{q_i}\right) + (1 - p_i) \times \log\left(\frac{1 - p_i}{1 - q_i}\right)$$

where L is the set of all classification types, $q_i$ is the probability of the $i^{th}$ classification type obtained from the trained classifier, and p=1 if that classification type is previously labeled and p=0 if otherwise.

6. A tangible computer-readable medium storing instructions for controlling a computer device, as part of a spoken language understanding system, to perform the steps of:
classifying a set of labeled candidate utterances based on a previously trained classifier;
generating classification types for each candidate utterance, each classification type having a respective confidence score;
sorting the candidate utterances based on an analysis of the confidence score of each candidate utterance compared to a respective label of the candidate utterance, wherein the analysis is based at least in part on a Kullback-Liebler divergence; and
rechecking the candidate utterances that do not match the label of the respective candidate utterance when the Kullback-Liebler divergence is greater than a threshold.

7. The tangible computer-readable medium of claim 6, further comprising generating confidence scores for a plurality of labels associated with the classification types.

8. The tangible computer-readable medium of claim 6, further comprising receiving confidence scores from the previously trained classifier.

9. The tangible computer-readable medium of claim 6, further comprising identifying candidate utterances having a top choice of classification types that does not match the label of the respective candidate utterances.

10. A computer-implemented method for automatic speech recognition that extracts words from user speech, the system comprising:
classifying, via a processor, a set of labeled candidate utterances based on a previously trained classifier;
generating, via a processor, classification types for each candidate utterance;
receiving confidence scores for the classification types from the trained classifier;
sorting the classified utterances based on an analysis of the confidence score of each candidate utterance compared to a respective label of the candidate utterance, wherein the analysis is based at least in part on a Kullback-Liebler divergence; and
rechecking candidate utterances when the Kullback-Liebler divergence is greater than a threshold.

11. The computer-implemented method of claim 10, wherein the analysis is based on a comparison of the generated classification type of the candidate utterance and the label of the candidate utterance, and the module rechecks the candidate utterances when the generated classification type does not match the label of the candidate utterance.

12. The computer-implemented method of claim 10, wherein the Kullback-Leibler divergence is based on the computation:

$$KL(P\|Q) = \sum_{i \in L} p_i \times \log\left(\frac{p_i}{q_i}\right) + (1 - p_i) \times \log\left(\frac{1 - p_i}{1 - q_i}\right)$$

where L is the set of all classification types, $q_i$ is the probability of the $i^{th}$ classification type obtained from the trained classifier, and p=1 if that classification type is previously labeled and p=0 if otherwise.

13. The computer-implemented method of claim 10, wherein the classification types include call classification types.

14. The computer-implemented method of claim 10, wherein the trained classifier comprises an iterative classifier.

* * * * *